J. GOODMAN.
Balance-Valves for Steam-Engines.

No. 156,340. Patented Oct. 27, 1874.

Attest
Inventor
John Goodman
By F. Millward
Attorney

UNITED STATES PATENT OFFICE.

JOHN GOODMAN, OF HAMILTON, OHIO.

IMPROVEMENT IN BALANCE-VALVES FOR STEAM-ENGINES.

Specification forming part of Letters Patent No. 156,340, dated October 27, 1874; application filed September 28, 1874.

*To all whom it may concern:*

Be it known that I, JOHN GOODMAN, of Hamilton, Butler county and State of Ohio, have invented certain new and useful Improvements in Balance-Valves for Steam-Engines, of which the following is a specification:

My invention consists in the first part of the combination of several elements composing a slide-valve device, whereby I gain a perfectly adjusted or balance valve, said elements consisting of a valve having interior screw-thread formed in it, a corresponding perforated slide, an adjusting male screw having a collar, with another male screw beyond, and a wrench-head for adjustment at the end, a perforated cover to steam-chest, and check-nut on said adjusting-screw, the whole serving to enable the engineer to conveniently and permanently adjust the slide which steam is on; and my invention consists in the second part, in combination with the above-mentioned parts, of a particular construction of said adjusting-screw and slide, by which the slide may adapt itself automatically to the valve-cover.

Figure 1:
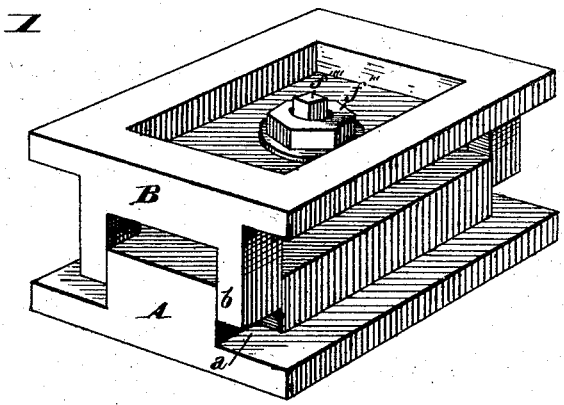
Figure 2:
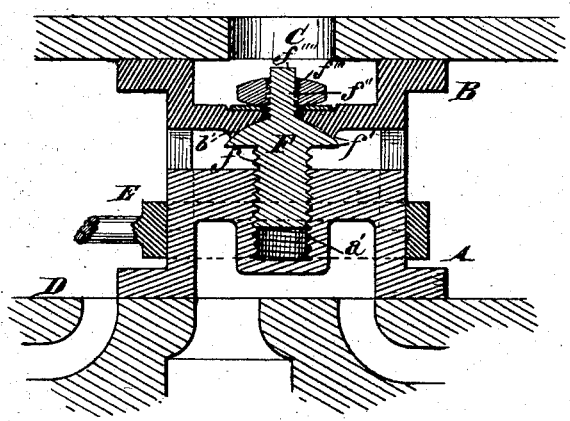
Figure 3:
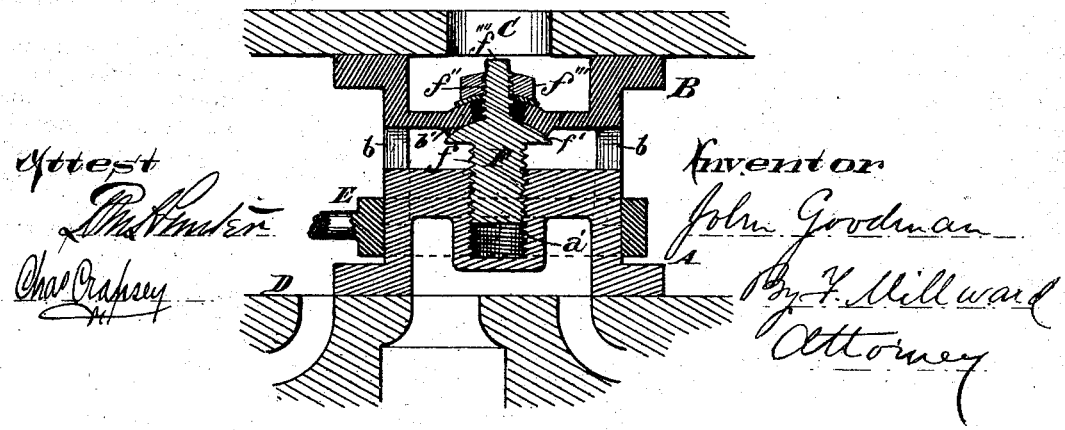

Figure 1 is a perspective view of a balance-valve embodying my invention. Fig. 2 is a section of same, showing seats and power connection. Fig. 3 represents a similar section, showing the modified form of check-nut and bearing.

A is the valve, in which is formed a female-screw thread, $a'$; and B is the balancing-slide connected thereto, and seating against the perforated top C. The slide and valve are connected together against lateral displacement by means of lugs and blanks $b$ and $a$, and are set in motion through rod and yoke E from the usual cam-shaft. To connect the valve and slide together vertically, and adjust their distance apart, I provide the adjusting-screw F, formed with a male-thread, $f$, to enter the female thread $a'$ in the valve, and collar $f'$ to press against the slide B, and keep it against the top plate C, while the screw part $f''$ of the screw F projects through the slide, and receives the check-nut $f'''$, which acts to resist the pressure of the slide B against the top C, due to the pressure of steam in the chest. Formed upon adjusting-screw F, beyond the thread $f''$, is a wrench-head, $f''''$, capable of being turned by a wrench being introduced through aperture in top C.

The device, as described above, constitutes a balanced valve; and to render the slide capable of adjusting itself to its upper and lower seats, I form the collar $f'$ with convex pressing-surface, the slide B with corresponding concavity $b'$, the check-nut $f'''$ of concave bearing face, and washer and bearing on slide B of corresponding convex shape, the whole acting to enable the slide to adapt itself to its seat automatically. The aperture in the top plate C renders it an easy task for the engineer to adjust the valve by turning check-nut $f'''$ or screw F at any time, whether steam is on or not; and, to prevent casual leakage, a plug may be inserted when the aperture is not in use.

It is obvious that one or more screws F may be used on one valve without departing from my invention.

I claim—

1. The combination of valve A, having interior screw-thread $a'$, perforated slide B, perforated cover C, adjusting-screw F, having male screw $f$, collar $f'$, screw-thread $f''$, check-nut $f'''$, and wrench-head $f''''$, substantially as and for the purpose set forth.

2. The combination of valve A, having interior screw-thread $a'$, perforated slide B, having concaved recess $b'$, perforated cover C, adjusting-screw F, having male screw $f$, convex collar $f'$, screw-thread $f''$, check-nut $f'''$, and wrench-head $f''''$, substantially as and for the purpose specified.

In testimony of which invention I hereunto set my hand.

JOHN GOODMAN.

Witnesses:
   R. M. HUNTER,
   F. MILLWARD.